US012711896B2

(12) United States Patent
Tian

(10) Patent No.: US 12,711,896 B2
(45) Date of Patent: Aug. 18, 2026

(54) DISPLAY DEVICE AND DRIVING METHOD THEREOF

(71) Applicant: TCL CHINA STAR OPTOELECTRONICS TECHNOLOGY CO., LTD., Shenzhen (CN)

(72) Inventor: Qiuling Tian, Shenzhen (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 19/095,004

(22) Filed: Mar. 30, 2025

(65) Prior Publication Data

US 2026/0188170 A1 Jul. 2, 2026

(30) Foreign Application Priority Data

Dec. 26, 2024 (CN) ......................... 202411951418.0

(51) Int. Cl.
*G09G 3/20* (2006.01)
*G09G 3/00* (2006.01)

(52) U.S. Cl.
CPC ........... *G09G 3/2092* (2013.01); *G09G 3/006* (2013.01); *G09G 2310/0267* (2013.01); *G09G 2330/025* (2013.01); *G09G 2330/06* (2013.01)

(58) Field of Classification Search
CPC ................. G09G 3/2092; G09G 3/006; G09G 2310/0267; G09G 2330/025; G09G 2330/06
See application file for complete search history.

(56) References Cited

FOREIGN PATENT DOCUMENTS

| | | | | |
|---|---|---|---|---|
| CN | 107508252 A | | 12/2017 | |
| CN | 109617008 A | | 4/2019 | |
| CN | 109713638 A | | 5/2019 | |
| CN | 110060644 | * | 7/2019 | G09G 3/3648 |
| CN | 110060644 A | | 7/2019 | |
| CN | 110910844 A | | 3/2020 | |
| CN | 111627376 A | | 9/2020 | |
| CN | 111798809 A | | 10/2020 | |
| CN | 118198981 | * | 6/2024 | H02H 3/04 |
| CN | 118198981 A | | 6/2024 | |

OTHER PUBLICATIONS

Chinese Office Action issued in corresponding Chinese Patent Application No. 202411951418.0 dated Aug. 9, 2025, pp. 1-9.

* cited by examiner

*Primary Examiner* — Jonathan A Boyd
(74) *Attorney, Agent, or Firm* — PV IP PC; Peter Stecher; Wei Te Chung

(57) ABSTRACT

The present disclosure provides a display device and a driving method thereof. The display device has a first working mode and includes a display panel and a driving circuit board electrically connected to the display panel. In the first working mode, the driving circuit board is configured to perform an overcurrent protection on the display panel when a current in the signal line is greater than a preset current during at least two consecutive frames.

9 Claims, 4 Drawing Sheets

DISPLAY DEVICE AND DRIVING METHOD THEREOF

CROSS-REFERENCE TO RELATED APPLICATION

This application claims priority to Chinese Patent Application No. 202411951418.0, filed on Dec. 26, 2024. The disclosure of the aforementioned application is incorporated herein by reference in its entirety.

TECHNICAL FIELD

The present disclosure relates to the field of display technologies, and in particular, to a display device and a driving method thereof.

BACKGROUND

As an advanced display driving technology, the tri-gate driving technology can be used to reduce a number of display driving circuit boards, thereby reducing the costs of chips.

However, in the tri-gate driving technology, since each pixel unit needs to be controlled by three gate signals to turn on in sequence, the scanning time of each row of subpixels is short, which causes a problem that a large current in a clock signal line connected to a gate driving circuit cannot be released quickly during an electrostatic test. It is easy to accidentally trigger the overcurrent protection of the display device, causing a black screen and making it impossible to complete the electrostatic test.

SUMMARY

Embodiments of the present disclosure provide a display device with a first working mode, including a display panel including a signal line; and a driving circuit board electrically connected to the display panel. In the first working mode, the driving circuit board is configured to perform an overcurrent protection on the display panel when a current in the signal line is greater than a preset current during at least two consecutive frames.

Embodiments of the present disclosure also provide a driving method of a display device, including: acquiring, by a driving circuit board, a current in a signal line of a display panel; in a first working mode, determining, by the driving circuit board, whether the current in the signal line is greater than a preset current during at least two consecutive frames; and if yes, performing, by the driving circuit board, an overcurrent protection on the display panel.

DETAILED DESCRIPTION

Technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments of the present disclosure, all other embodiments obtained by those skilled in the art without making creative efforts fall within the scope of protection of the present disclosure.

In the description of the present disclosure, the terms "first", "second", etc. are used for descriptive purposes only and cannot be understood as indicating or implying relative importance or implicitly indicating a number of indicated technical features. Thus, features defined as "first" and "second" may explicitly or implicitly include one or more of the described features. In addition, it should be noted that the accompanying drawings only provide structures that are closely related to the present disclosure and omit some details that are not closely related to the present disclosure. The purpose is to simplify the drawings and make the present disclosure points clear at a glance, rather than to illustrate that an actual device is exactly the same as the drawings, and is not intended to be a limitation of the actual device.

Reference herein to "embodiment" means that a particular feature, structure, or characteristic described in connection with the embodiments can be included in at least one embodiment of the present disclosure. The appearances of this phrase at various places in the specification are not necessarily all referring to the same embodiment, nor are separate or alternative embodiments mutually exclusive of other embodiments. Those skilled in the art understand, both explicitly and implicitly, that the embodiments described herein may be combined with other embodiments.

The present disclosure provides a display device, which includes, but is not limited to, the following embodiments and combinations of the following embodiments.

Figure 1:
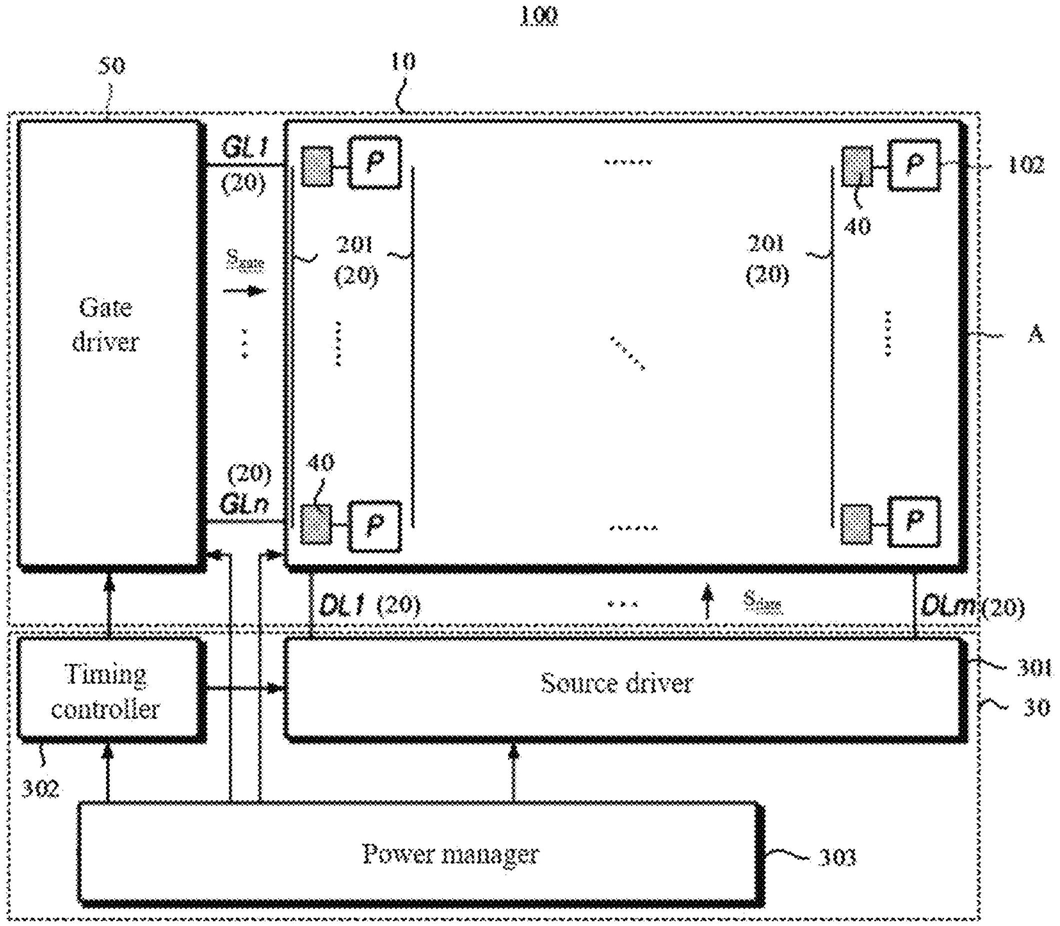
FIG. 1 is an architectural diagram of a display device according to embodiments of the present disclosure.

In some embodiments, as illustrated in FIG. 1, a display device 100 has a first working mode and includes: a display panel 10 including a signal line 20; and a driving circuit board 30 electrically connected to the display panel 10. In the first working mode, the driving circuit board 30 is configured to perform overcurrent protection on the display panel 10 when a current in the signal line 20 is greater than a preset current during at least two consecutive frames.

The display device 100 is, but is not limited to, an organic self-luminous display device, an inorganic self-luminous direct display device, or a liquid crystal display device. As illustrated in FIG. 1, that a plurality of subpixels P in a display area A of the display panel 10 are arranged in an array of n rows and m columns is taken as an example here, where n and m are both positive integers. Correspondingly, the display panel 10 can also include a plurality of data lines (DL1 to DLm), a plurality of gate lines (GL1 to GLn), a plurality of pixel circuits 40 corresponding to the plurality of subpixels P, a source driver 301 electrically connected to the plurality of data lines, and a gate driver 50 electrically connected to the plurality of gate lines. The gate driver 50 may be a gate driving circuit located on a substrate of the display panel 10 or a chip provided independently of the substrate (FIG. 1 only illustrates the former case condition as an example).

Specifically, each subpixel P is electrically connected to a corresponding one of the pixel circuits 40, and each gate line (each of GL1 to GLn) is electrically connected to the plurality of pixel circuits 40 corresponding to the plurality of subpixels P located in a corresponding row to output a corresponding gate signal $S_{gate}$ thereto. In each frame, the gate signal $S_{gate}$ includes a gate pulse configured to control the corresponding plurality of pixel circuits 40 to turn on, and the plurality of rows of pixel circuits 40 are turned on sequentially under the control of a plurality of gate pulses of the plurality of gate signals. Each data line (each of DL1 to DLm) is connected to the plurality of pixel circuits 40 corresponding to the plurality of subpixels P located in a corresponding column to output corresponding data signals $S_{data}$ thereto. A plurality of data signals corresponding to the plurality of columns of subpixels P are configured as follows: when the pixel circuits 40 in each row are turned on, the plurality of data signals data transmit a plurality of effective data voltages corresponding to the subpixels P in the same row. In this way, when the pixel circuits 40 in each row are turned on, the plurality of subpixels P in the same row are driven to emit light by the plurality of effective data voltages corresponding thereto respectively. By analogy, the plurality of rows of subpixels P finally emits light to display an image of this frame.

Furthermore, in addition to the above-mentioned source driver 301, the driving circuit board 30 of this embodiment may also include a timing controller 302 electrically connected to the source driver 301 and the gate driver 50, and a power manager 303 electrically connected to the source driver 301, the gate driver 50, the timing controller 302, and the plurality of pixel circuits 40. The plurality of pixel circuits 40 are electrically connected to the power manager 303 through a plurality of power signal lines 201. The power manager 303 can supply power to the driving circuit board 30 and the display panel 10. The timing controller 302 can generate a grayscale signal and a corresponding first control signal that act on the source driver 301, and can also generate a corresponding second control signal that acts on the gate driver 50. Then, the source driver 301 generates the plurality of data signals $S_{data}$ in response to the grayscale signal Sg and the first control signal, and the gate driver 50 generates the plurality of gate signals $S_{gate}$ in response to the second control signal.

In conjunction with the above discussion, the signal line 20 of the display panel 10 may include at least one of the plurality of gate lines (GL1 to GLn), the plurality of data lines (DL1 to DLm), and the plurality of power signal lines 201.

It should be noted that in order to avoid the damage to the display device 100 due to an excessive current caused by a short circuit or other faults of the signal line 20 of the display panel 10, it is generally possible to control whether to enable the overcurrent protection of the display panel 10 by detecting whether the current in the signal line 20 is greater than a preset current during one frame, so as to cut off or limit the current supplied for the display panel 10. However, when an electrostatic discharge capability of the display device 100 is tested, due to charge accumulation, the current in the signal line 20 of the display panel 10 is also relatively large, causing the existing overcurrent protection to be accidentally triggered, resulting in a black screen of the display panel 10, and thus the test of the electrostatic discharge capability could not be completed It can be understood that the charge accumulated due to the test of electrostatic discharge capability can be released in a starting period of each frame to reduce the current (unlike the charge accumulation caused by a short circuit or other faults of the signal line 20 which does not have a release path and results in a continuous excessive current), that is, a risk of excessive current caused by the test of electrostatic discharge capability is generally concentrated between a starting time of a current frame and a starting time of a next frame. In this embodiment, the driving circuit board 30 is configured to enable the overcurrent protection of the display panel 10 in the first working mode on a condition that the current in the signal line 20 is greater than the preset current during at least two consecutive frames, that is, the overcurrent protection is enabled when it is detected that the current in the signal line 20 is greater than the preset current during at least two consecutive frames. Thus, the overcurrent protection is not enabled when a large current in the signal line 20 is detected within only one frame, preventing accidental triggering of the overcurrent protection during the test of electrostatic discharge capability, which would otherwise interrupt the test of electrostatic discharge capability, and improving the reliability of the test of electrostatic discharge capability.

Figure 2:
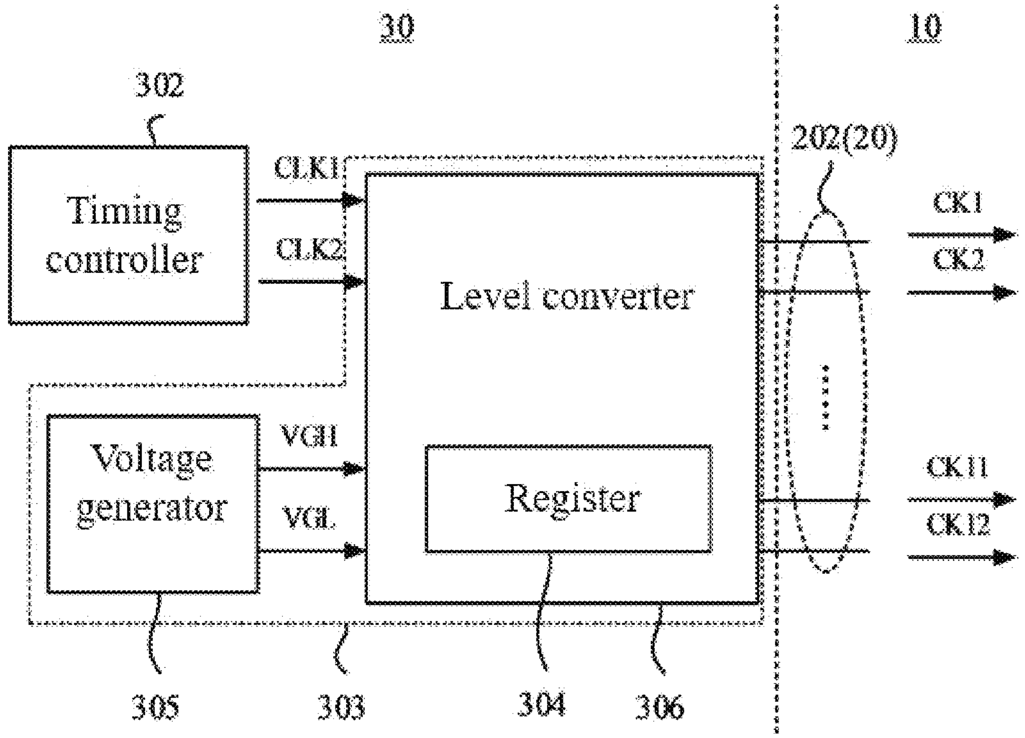
FIG. 2 is a block diagram of a display device according to embodiments of the present disclosure.

In some embodiments, as illustrated in FIG. 1, FIG. 2, and Table 1, the display device 100 further has a second working mode. In the second working mode, the driving circuit board 30 is configured to enable the overcurrent protection of the display panel 10 on a condition that the current in the signal line 20 is greater than the preset current during one frame. Specifically, the driving circuit board 30 includes a register 304, and the driving circuit board 30 is configured to perform the overcurrent protection on the display panel 10 according to the information stored in the register 304 and the current in the signal line 20. In the second working mode, the information stored in the register 304 includes first information, and the driving circuit board 30 is configured to perform the overcurrent protection on the display panel 10 when the current in the signal line 20 is greater than the preset current during one frame; in the first working mode, the information stored in the register 304 includes second information, and the driving circuit board 30 is configured to perform the overcurrent protection on the display panel 10 when the current in the signal line 20 is greater than the preset current during at least two consecutive frames.

Based on the above discussion, it can be seen that the information stored in the register 304 includes the first information (for example, "000" in Table 1) or the second information (for example, one of these seven types of information "001" . . . "111" in Table 1). When the information stored in the register 304 includes the first information, the driving circuit board 30 is configured to enable the overcurrent protection of the display panel 10 when the current in the signal line 20 is greater than the preset current during one frame; and when the information stored in the register 304 includes the second information, the driving circuit board 30 is configured to enable the overcurrent protection of the display panel 10 when the current in the signal line 20 is greater than the preset current during at least two consecutive frames.

Based on the above discussion, it can be seen that when the display device 100 is not in the process of testing the electrostatic discharge capability, if the current in the signal line 20 is too large due to a short circuit or other fault, it is generally necessary to control whether to enable the overcurrent protection by detecting whether the current in the signal line 20 is greater than the preset current during one frame.

It can be understood that this embodiment sets the information stored in the register 304 of the driving circuit board 30 to include the first information or the second information, so that the driving circuit board 30 determines "a number of detected frames" that is required for the overcurrent protection based on the information stored in the register 304. The overcurrent protection is enabled when it is detected that the current in the signal line 20 is greater than the preset current in the corresponding "detected frames". In this way, different overcurrent protection mechanisms can be set in different scenarios, which reduces a risk of damage to the display device 100 caused by overcurrent due to a short circuit or other faults in the signal line 20 of the display panel 10, and reduces a risk that the signal line 20 interrupts the test of electrostatic discharge capability due to accidental triggering of the overcurrent protection caused by accumulation of static electricity.

As illustrated in Table 1, for example: the information stored in the register 304 can at least include three bits of data from low to high: Bit0, Bit1, and Bit2. Each bit can be 0 or 1, and different values of the three bits of data can be combined into eight types of information "000", "001" . . . "111". If each bit of data corresponds to a binary number, then when the value corresponding to the information is decimal i, the corresponding "number of detected frames" can be (i+1), where i is any integer from 0 to 7.

Specifically, combined with the above definitions of "first information" and "second information", it can be seen that: "first information" is "000", and the corresponding "number of detected frames" is 1 frame, that is, the overcurrent protection is enabled when detecting the current in the signal line 20 is greater than the preset current during one frame, and an application scenario at this time may not be the test of electrostatic discharge capability, that is, it is applied to detect whether the signal line 20 has an overcurrent due to a short circuit or other faults; and "second information" is one of these seven types of information "001" . . . "111", the corresponding "number of detected frames" is greater than or equal to 2 frames, that is, the overcurrent protection is only enabled when it is detected that the current in the signal line 20 is greater than the preset current during at least two consecutive frames, and an application scenario at this time may be a test of electrostatic discharge capability.

TABLE 1

| Bit2 | Bit1 | Bit0 | Number of detected frames |
|---|---|---|---|
| 0 | 0 | 0 | 1 frame |
| 0 | 0 | 1 | 2 frames |
| 0 | 1 | 0 | 3 frames |
| 0 | 1 | 1 | 4 frames |
| 1 | 0 | 0 | 5 frames |
| 1 | 0 | 1 | 6 frames |
| 1 | 1 | 0 | 7 frames |
| 1 | 1 | 1 | 8 frames |

Referring to the above discussion about Table 1, it can be seen that the second information is at least a first sub-information (for example, "001" in Table 1) or a second sub-information (for example, "010" in Table 1). When the information stored in the register 304 includes the first sub-information, the driving circuit board 30 is configured to enable the overcurrent protection of the display panel 10 on a condition that the current in the signal line 20 is greater than the preset current during two consecutive frames. When the information stored in the register 304 includes the second sub-information, the driving circuit board 30 is configured to enable the overcurrent protection of the display panel 10 on a condition that the current in the signal line 20 is greater than the preset current during at least three consecutive frames.

It can be understood that when the application scenario is the test of electrostatic release capability, this embodiment is further refined into a plurality of sub-scenarios for testing electrostatic release capability. The difference between the sub-scenarios is that different amounts of electrostatic charges accumulated in the signal line 20 during the test of electrostatic discharge capacity. It can be considered that the more the amount of accumulated electrostatic charges, the more frames it takes for the accumulated electrostatic charges to be released until the signal line 20 has no overcurrent, and in other words, the more frames the overcurrent in the signal line 20 will last. At this time, in order to avoid enabling the overcurrent protection and interrupting the test of electrostatic discharge capability, it is necessary to set the "number of detected frames" required to enable the overcurrent protection to be larger, that is, the second information is the sub-information corresponding to the decimal number with the larger value.

It can be seen that in this embodiment, by setting the second information to be a variety of sub-information, the driving circuit board 30 can enable the overcurrent protection when the current in the signal line 20 is greater than the preset current during different numbers of consecutive frames, which is suitable for the test of electrostatic discharge capability under different amounts of accumulated electrostatic charges, further improving the reliability of the test of electrostatic discharge capability.

Of course, in other embodiments, as illustrated in FIG. 1, FIG. 2, and Table 1, when the information stored in the register 304 includes the second information, the driving circuit board 30 is configured to enable the overcurrent protection of the display panel 10 when the current in the signal line 20 is greater than the preset current during two consecutive frames.

Comparing with the above discussion about Table 1, when the application scenario is the test of electrostatic discharge capability, in this embodiment it can be considered that whether the second information corresponds to only one decimal value or corresponds to a plurality of above decimal values, the driving circuit board 30 is configured as follows: when the information stored in the register 304 includes the second information and the corresponding "number of detected frames" is two frames, that is, on a condition that the application scenario is the test of electrostatic discharge capability, the overcurrent protection is enabled only when detecting that the current in the signal line 20 is greater than the preset current during two consecutive frames.

It can be seen that compared with the embodiment in Table 1, in this embodiment, it can be considered that a large current in the signal line 20 during the test of electrostatic discharge capability can be converted into a small current through electrostatic discharge within one frame. The embodiment avoids the need to enable the overcurrent protection only when the current in the signal line 20 is detected to be greater than the preset current during at least three consecutive frames, that is, the overcurrent protection is enabled only when the current in the signal line 20 is detected to be greater than the preset current during two consecutive frames, which can reduce a risk of damage to the display device 100 caused by overcurrent due to a short circuit or other faults of the signal line 20 during the test of electrostatic discharge capability.

Figure 3:
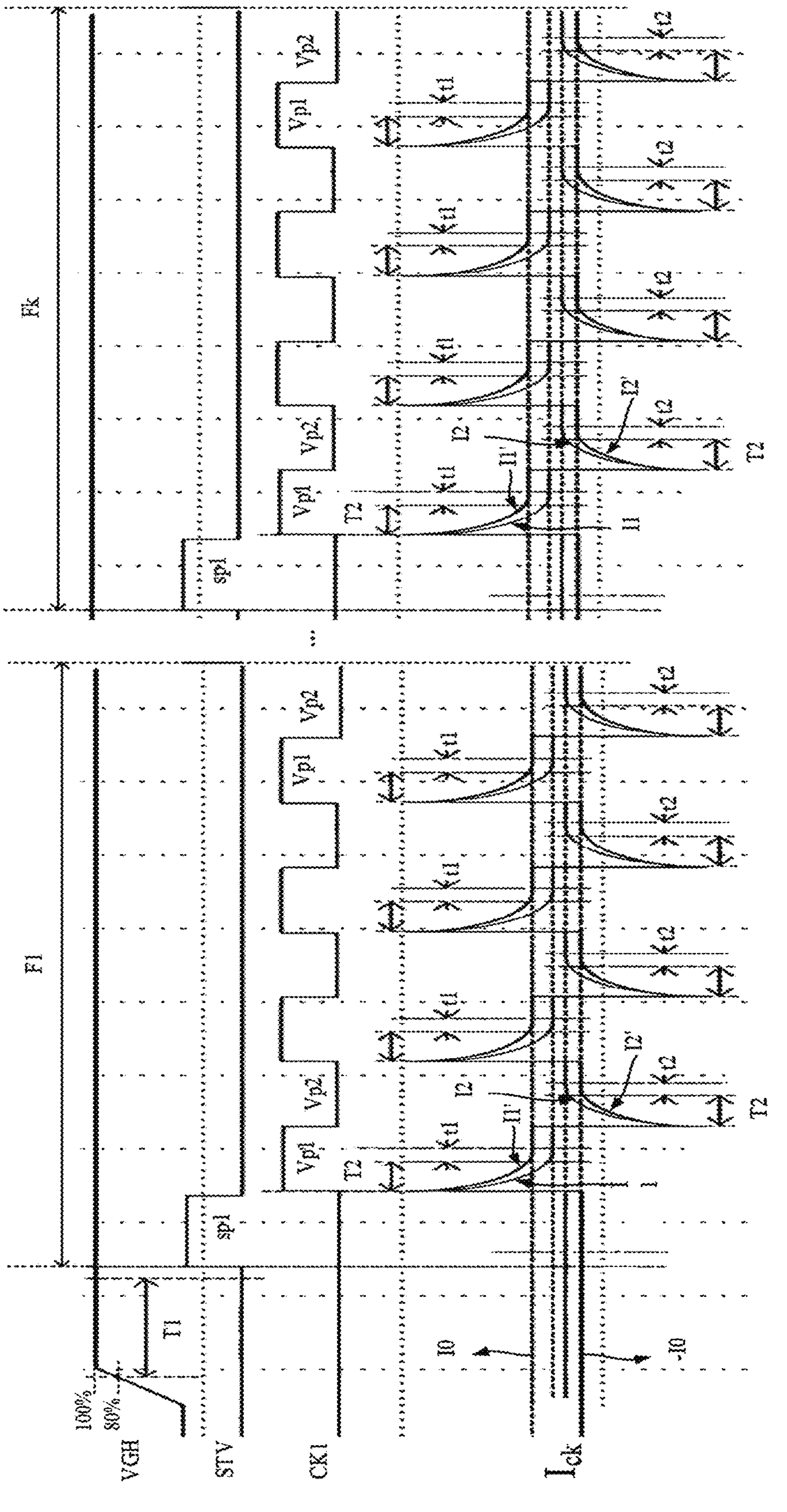
FIG. 3 is a waveform diagram of some signals in a display device according to embodiments of the present disclosure.

In some embodiments, as illustrated in FIG. 1 to FIG. 3, the driving circuit board 30 is configured to determine whether the current in the signal line 20 is greater than the preset current I0 in one frame by determining whether an absolute value of the current (for example, a corresponding signal is a current signal $I_{ck}$ in FIG. 3) in the signal line 20 is greater than the preset current in two periods spaced apart (for example, two ones of four periods t1 and four periods t2 in FIG. 3) within the frame; and/or, the driving circuit board 30 is configured to determine whether the current in the signal line 20 is greater than the preset current I0 in one frame by determining whether the case that the absolute value of the current of the signal line 20 is greater than the preset current in the frame persists for at least a preset duration.

It can be understood that this embodiment further illustrates that within one frame, it is necessary to determine whether the absolute value of the current in the signal line 20 is greater than the preset current I0 in the two periods spaced apart, and/or determine whether the absolute value of the current in the signal line 20 continues to be greater than the preset current I0 during a preset duration, so as to determine whether the current in the signal line 20 is greater than the preset current I0 in one frame, thereby improving the reliability of determining whether the current in the signal line 20 is greater than the preset current I0 in the frame, and avoiding accidentally triggering the overcurrent protection due to the absolute value of the current in the signal line 20 being greater than the preset current I0 in an instant.

In some embodiments, as illustrated in FIG. 1 to FIG. 3, the display panel 10 includes: the above-mentioned plurality of subpixels P; the above-mentioned plurality of gate lines (GL1 to GLn); the above-mentioned gate driving circuit (may be the gate driver 50) electrically connected to the plurality of gate lines and configured to transmit the above-mentioned corresponding gate signals $S_{gate}$ to the corresponding plurality of subpixels P through the gate lines; and a plurality of clock signal lines 202 electrically connected to the gate driving circuit and respectively configured to transmit a plurality of clock signals (for example, CK1, CK2 to CK12). The plurality of clock signals are configured for the gate driving circuit to generate the plurality of gate signals $S_{gate}$. The signal line 20 includes at least one of the clock signal lines 202. The driving circuit board 30 is at least configured to enable the overcurrent protection of display panel 10 when a current in at least one of the clock signal lines 202 is greater than the preset current I0 during at least two consecutive frames.

The driving circuit board 30 includes: the above-mentioned timing controller 302 configured to generate clock source signals (including, but not limited to, a first clock source signal CLK1 and a second clock source signal CLK2 and configured to drive the display panel 10 to display images (through the source driver 301 and the gate driver 50); and a level converter 306 (for example, included in the power manager 303) electrically connected to the timing controller 302 and the plurality of clock signal lines 202 and configured to generate the plurality of clock signals in response to the clock source signals.

Specifically, as illustrated in FIG. 1 and FIG. 2, a voltage generator 305 included in the power manager 303 can provide a high-voltage signal VGH and a low-voltage signal VGL with different amplitudes to the level converter 306, and the timing controller 302 can provide a first clock source signal CLK1 and a second clock source signal CLK2 (both clock signals) with a phase difference therebetween to the level converter 306. The converter 306 can generate the plurality of clock signals (for example, CK1, CK2 to CK12) based on the phases of the first clock source signal CLK1 and the second clock source signal CLK2 and the amplitudes of the high-voltage signal VGH and the low-voltage signal VGL, and the plurality of clock signals are transmitted to the gate driving circuit respectively through the plurality of clock signal lines 202. Each stage of gate driving unit of the gate driving circuit generates a corresponding one of the gate signal $S_{gate}$ in response to at least two of the clock signals.

The register 304 may be included in the level converter 306. An execution subject of the above-mentioned "enabling the overcurrent protection of the display panel 10 when the current in the clock signal line 202 is greater than the preset current I0 during at least two consecutive frames" may be the level converter 306. The level converter 306 may also be set independently from the power manager 303.

It can be understood that this embodiment considers that the current in the clock signal line 202 is easily large and causes overcurrent. Therefore, the object of the current detected by the driving circuit board 30 may be a current in the clock signal line 202, which can greatly reduce the risk of damage to the display device 100 due to overcurrent.

When the signal line 20 having the current to be detected includes at least one of the clock signal lines 202, enabling the overcurrent protection may at least include controlling the level converter 306 to no longer output the corresponding clock signal, so that the corresponding clock signal line 202 becomes to have a high resistance state, thereby reducing the corresponding current.

Based on the above discussion, it can be seen that since the first clock source signal CLK1 and the second clock source signal CLK2 are both clock signals, as illustrated in FIG. 3, an amplitude of the clock signal (is a voltage signal, shown as CK1) accordingly generated alternates between a first potential Vp1 and a second potential Vp2 within one frame. The current signal $I_{ck}$ corresponding to the current in the clock signal line includes a first sub-current signal I1/I1' corresponding to the first potential Vp1 and a second sub-current signal I2/I2' corresponding to the second potential Vp2. During one frame, the driving circuit board 30 (the level converter 306 included therein) is configured to determine whether the current in the signal line 20 is greater than the preset current I0 during the frame by determining whether an absolute value of a potential of at least one first sub-current signal I1/I1' when it is stable and/or an absolute value of a potential of at least one second sub-current signal I2/I2' when it is stable is greater than the preset current I0.

Specifically, as illustrated in FIG. 3, after the high-voltage signal VGH reaches a certain proportion (for example, 80%) of its maximum value and lasts for a first time period T1 (for example, 130 ms), it is considered to be stable. After that, an appearance of a first frame start pulse sp1 of a frame start signal STV indicates the beginning of a first frame F1, and the amplitude of the clock signal CK1 alternates between the first potential Vp1 and the second potential Vp2, so that the corresponding gate driving unit generates the corresponding gate signal $S_{gate}$. An amplitude of the corresponding current signal $I_{ck}$ transmitted in the clock signal line 202 drops sharply and rises sharply respectively on a rising edge and a falling edge of the clock signal CK1.

On the rising edge of the clock signal CK1, after a second time period T2 (for example, 4 μs), the amplitude of the current signal $I_{ck}$ i.e., an absolute value (i.e., the potential of the first sub-current signal I1/I1' when it is stable) of the current signal $I_{ck}$ may be greater than, less than, or equal to the preset current I0 persisting for a duration such as 2 μs (i.e., during the corresponding period t1). In the same way, on the falling edge of the clock signal CK1, after the second time period T2 (for example, 4 μs), the amplitude of the current signal $I_{ck}$, i.e., an absolute value (i.e., the potential of the second sub-current signal I2/I2' when it is stable) of the current signal $I_{ck}$ may be greater than, less than, or equal to the preset current I0 persisting for a duration such as 2 μs (i.e., during the corresponding period t2).

Specifically, this embodiment determines whether the current in the signal line 20 is greater than or equal to the preset current I0 during a frame by determining whether at least one of the absolute values of the potential of the first sub-current signal I1/I1' when it is stable and the potential of the second sub-current signal I2/I2' when it is stable is greater than the preset current I0. Since a number of the first sub-current signals I1/I1' in one frame and a number of the second sub-current signals I2/I2' are the same, it can be actually determined whether the current in the signal line 20 is greater than the preset current I0 during this frame by determining whether the absolute values of the potentials of j consecutive first sub-current signals I1/I1' when they are stable and/or the absolute values of the potentials of j consecutive second sub-current signals I2/I2' when they are stable are greater than the preset current I0, where j is a positive integer.

For example, when j=4, it means to determine whether the absolute values of the potentials of four consecutive first sub-current signals I1/I1' when they are stable and/or the absolute values of the potentials of four second sub-current signals I2/I2' when they are stable are all greater than the preset current I0. For example, the current signal $I_{ck}$ in FIG. 3 includes four consecutive first sub-current signals I1 and four consecutive second sub-current signals I2. Since the absolute values of the potentials of the eight sub-current signals when they are stable are all less than the preset current I0, the current signal $I_{ck}$ is considered to be less than the preset current I0 during this frame. For another example, the current signal $I_{ck}$ includes four consecutive first sub-current signals I1' and four consecutive second sub-current signals I2'. Since the absolute values of the potentials of the eight sub-current signals when they are stable are all greater than the preset current I0, the current signal $I_{ck}$ is considered to be greater than the preset current I0 during this frame.

It can be seen that in this embodiment, on the premise of determining whether the current signal $I_{ck}$ of the clock signal line 202 is greater than the preset current I0 during at least two consecutive frames, considering that the clock signal CK1 is a clock signal, the determination is performed based on value relationships between the absolute values of the potentials of the sub-current signals I1/I1' and the second sub-current signals I2/I2' of the corresponding current signal $I_{ck}$ when they are stable and the preset current I0, thereby further improving the reliability of determining "whether the current in the signal line 20 is greater than or equal to the preset current I0 during the frame(s)".

FIG. 3 only illustrates that the overcurrent protection of the display panel 10 is enabled when the current in the clock signal line 202 configured for transmitting the clock signal CK1 is greater than the preset current I0 during consecutive k frames (for example, from the first frame F1 to a k-th frame Fk), where k is a positive integer greater than 1. In practical applications, values of k, j, a time duration of the period t1, a time duration of the period t2, etc. are not limited.

Figure 4:
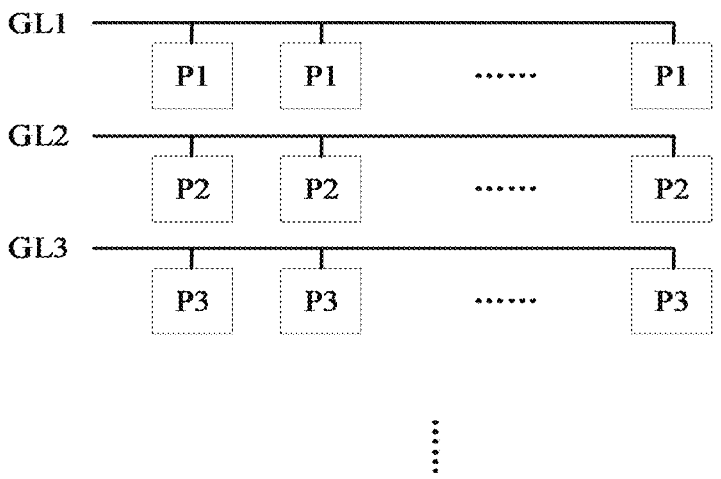
FIG. 4 is a top view of a display panel according to embodiments of the present disclosure

In some embodiments, as illustrated in FIG. 1 and FIG. 4, the plurality of subpixels P include a plurality of first subpixels P1, a plurality of second subpixels P2, and a plurality of third subpixels P3. The first subpixel P1, the second subpixel P2, and the third subpixel P3 have different colors. Each of the gate lines (each of GL1 to GLn) is connected to a corresponding plurality of first subpixels P1, a corresponding plurality of second subpixels P2, or a corresponding plurality of third subpixels P3. That is to say, the display panel 10 in this embodiment has a three-gate structure. Specifically, each gate line is connected to a plurality of subpixels P of the same color. At this time, three subpixels P in one pixel unit (including one first subpixel P1, one second subpixel P2, and one third subpixel P3) originally connected to one same gate line T need to be electrically connected three gate lines, respectively, thereby reducing a number of output terminals of the source driver 301 or a number of source drivers 301, but the number of gate lines will be tripled, resulting in that a time period for the gate driver 50 to scan each row of subpixels P is shortened to one-third of the original time.

It can be understood that this embodiment further limits the application scenario of the above overcurrent protection mechanism to the tri-gate architecture. Since a duration of the gate signal $S_{gate}$ in the tri-gate architecture is short after its gate pulse in one frame, the charges accumulated during the test of electrostatic discharge capability cannot be fully released, resulting in a greater risk of large current in the signal line 20 within this frame. Therefore, the above-mentioned overcurrent protection mechanism has a greater benefit in improving the reliability of the test of electrostatic discharge capability.

In some embodiments, as illustrated in FIG. 1 and FIG. 2, the display panel 10 includes: the above-mentioned plurality of subpixels P; the above-mentioned plurality of pixel circuits 40 each electrically connected to corresponding subpixels P; a gate driving circuit (i.e. the above-mentioned gate driver 50) electrically connected to the plurality of pixel circuits 40; and the above-mentioned plurality of power signal lines 201 each electrically connected to the gate driving circuit and at least one of the plurality of pixel circuits 40. The signal line 20 includes at least one power signal line 201. The driving circuit board 30 is at least configured to enable the overcurrent protection of the display panel 10 when the current in the at least one power signal line 201 is greater than the preset current during at least two consecutive frames.

Based on the above discussion, it can be seen that the plurality of pixel circuits 40 are electrically connected to the power manager 303 through the plurality of power signal lines 201. Of course, the gate driving circuit in the display panel 10 is also electrically connected to the power manager 303 through the plurality of power signal lines 201. Considering that the power signal line 201 also has the risk of overcurrent when it is short-circuited or during the test of electrostatic discharge capability, in this embodiment, the driving circuit board 30 is further configured to control whether to enable the overcurrent protection of the display panel 10 based on whether the current in the power signal line 201 is greater than the preset current during at least two consecutive frames. This further reduces the risk of damage to the display device 100 caused by overcurrent and reduces the risk of interrupting the test of electrostatic discharge capability.

Figure 5:
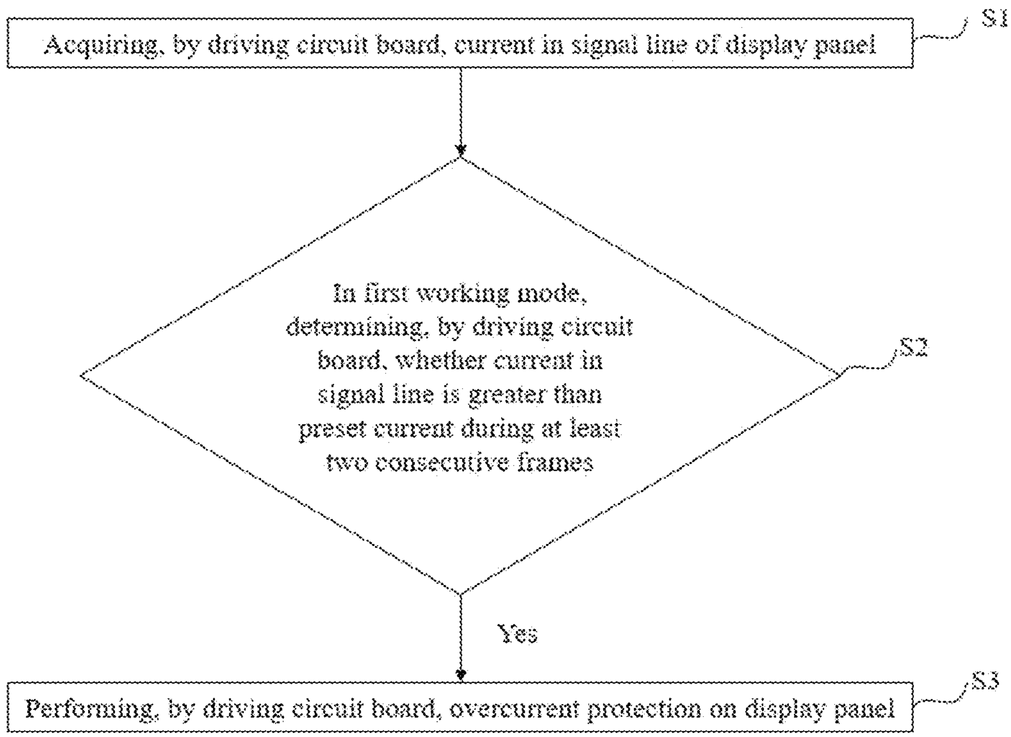
FIG. 5 is a flow chart of a driving method of a display device according to embodiments of the present disclosure.

In order to better explain the above display device, the present disclosure also provides a driving method of the display device. As illustrated in FIG. 5, the driving method may include, but is not limited to, the following steps and a combination of the following steps.

Step S1, in which the driving circuit board acquires the current in the signal line of the display panel.

Step S2, in which, in the first working mode, the driving circuit board determines whether the current in the signal line is greater than the preset current during at least two consecutive frames.

If yes, executing:

Step S3, in which the driving circuit board performs overcurrent protection on the display panel.

Based on the above discussion, it can be seen that when the signal line 20 having the current to be detected includes the clock signal line 202, an execution subject in step S1 may specifically include the level converter 306 included in the driving circuit board 30. Of course, when the signal line 20 having the current to be detected includes the power signal line 201, the execution subject in step S1 may specifically include the voltage generator 305 or the timing controller 302 included in the driving circuit board 30.

Regarding how to determine whether the current in the signal line 20 is greater than the preset current during at least two consecutive frames, reference may be made to the relevant discussion above.

The display device and the driving method of provided by the embodiments of the present disclosure are introduced in detail above. Specific examples are used in this paper to illustrate the principles and implementation methods of the present disclosure. The description of the above embodiments is only used to help understand technical solutions and their core ideas of the present disclosure. Those of ordinary skill in the art should understand that they can still modify the technical solutions recorded in the foregoing embodiments, or make equivalent substitutions for some of the technical features; and these modifications or substitutions do not make the essence of the corresponding technical solutions to be deviated from the scope of the technical solution in each embodiment of the present disclosure.

What is claimed is:

1. A display device, having different working modes for executing different overcurrent protection operation processes comprising a first working mode applicable to a test of an electrostatic discharge capability of the display device, and comprising:

a display panel comprising a signal line; and a driving circuit board electrically connected to the display panel, wherein in the first working mode, the driving circuit board is configured to perform an overcurrent protection on the display panel when a current in the signal line is greater than a preset current during at least two consecutive frames; wherein the driving circuit board is configured to determine whether the current in the signal line is greater than the preset current in one frame by determining whether an absolute value of the current in the signal line is greater than the preset current in two periods spaced apart within the frame; and/or the driving circuit board is configured to determine whether the current in the signal line is greater than the preset current in one frame by determining whether a case that the absolute value of the current of the signal line is greater than the preset current in the frame persists for at least a preset duration.

2. The display device according to claim 1, further having a second working mode, wherein in the second working mode, the driving circuit board is configured to perform the overcurrent protection on the display panel when the current in the signal line is greater than the preset current during one frame.

3. The display device according to claim 2, wherein the driving circuit board comprises a register, the driving circuit board is configured to perform the overcurrent protection on the display panel according to information stored in the register and the current in the signal line;

in the second working mode, the information stored in the register comprises a first information, and the driving circuit board is configured to perform the overcurrent protection on the display panel when the current in the signal line is greater than the preset current during one frame; and in the first working mode, the information stored in the register comprises a second information, and the driving circuit board is configured to perform the overcurrent protection on the display panel when the current in the signal line is greater than the preset current during at least two consecutive frames.

4. The display device according to claim 3, wherein when the information stored in the register comprises the second information, the driving circuit board is configured to perform the overcurrent protection on the display panel when the current in the signal line is greater than the preset current during two consecutive frames.

5. The display device according to claim 3, wherein the second information is at least a first sub-information or a second sub-information;

when the information stored in the register comprises the first sub-information, the driving circuit board is configured to perform the overcurrent protection on the display panel when the current in the signal line is greater than the preset current during two consecutive frames; and when the information stored in the register comprises the second sub-information, the driving circuit board is configured to perform the overcurrent protection on the display panel when the current in the signal line is greater than the preset current during at least three consecutive frames.

6. The display device according to claim 1, wherein the signal line comprises clock signal lines, the driving circuit board is at least configured to perform the overcurrent protection on the display panel when a current on at least one of the clock signal lines is greater than the preset current during at least two consecutive frames; and wherein the display panel comprises:

a plurality of subpixels;

a plurality of gate lines;

a gate driving circuit electrically connected to the plurality of gate lines and configured to transmit corresponding gate signals to corresponding ones of the subpixels through the gate lines; and a plurality of the clock signal lines electrically connected to the gate driving circuit and respectively configured to transmit a plurality of clock signals, and the plurality of clock signals being configured for the gate driving circuit to generate the plurality of gate signals.

7. The display device according to claim 6, wherein an amplitude of each of the clock signals alternates between a first potential and a second potential within one frame, current signals corresponding to currents in the clock signal lines comprise first sub-current signals corresponding to the first potential and second sub-current signals corresponding to the second potential; and the driving circuit board is configured to determine whether the current in the signal line is greater than the preset current during one frame by determining whether one of an absolute value of a potential of at least one of the first sub-current signals when stable, an absolute value of a potential of at least one of the second sub-current signals when stable, and a combination of the absolute value of the potential of at least one of the first sub-current signals when stable and the absolute value of a potential of at least one of the second sub-current signals when stable is greater than the preset current.

8. The display device according to claim 1, wherein the signal line comprises power signal lines, the driving circuit board is at least configured to perform the overcurrent protection on the display panel when a current in at least one of the power signal lines is greater than the preset current during at least two consecutive frames; and wherein the display panel comprises:

a plurality of subpixels;

a plurality of pixel circuits each electrically connected to a corresponding one of the subpixels;

a gate driving circuit electrically connected to the plurality of pixel circuits; and a plurality of the power signal lines electrically connected to the gate driving circuit and at least one of the plurality of pixel circuits.

9. A driving method of a display device having different working modes for executing different overcurrent protection operation processes comprising a first working mode applicable to a test of an electrostatic discharge capability of the display device, comprising:

acquiring, by a driving circuit board, a current in a signal line of a display panel;

in the first working mode, determining, by the driving circuit board, whether the current in the signal line is greater than a preset current during at least two consecutive frames;

and determining whether the current in the signal line is greater than the preset current in one frame by determining whether an absolute value of the current in the signal line is greater than the preset current in two periods spaced apart within the frame; and/or determining whether the current in the signal line is greater than the preset current in one frame by determining whether a case that the absolute value of the current of the signal line is greater than the preset current in the frame persists for at least a preset duration; and if yes, performing, by the driving circuit board, an overcurrent protection on the display panel.

* * * * *